Dec. 17, 1968    K. P. GRAY    3,416,313
FLUID TRANSMISSION
Filed March 13, 1967    3 Sheets-Sheet 1

INVENTOR.
Kenneth P. Gray
BY

Dec. 17, 1968   K. P. GRAY   3,416,313
FLUID TRANSMISSION
Filed March 13, 1967   3 Sheets-Sheet 2
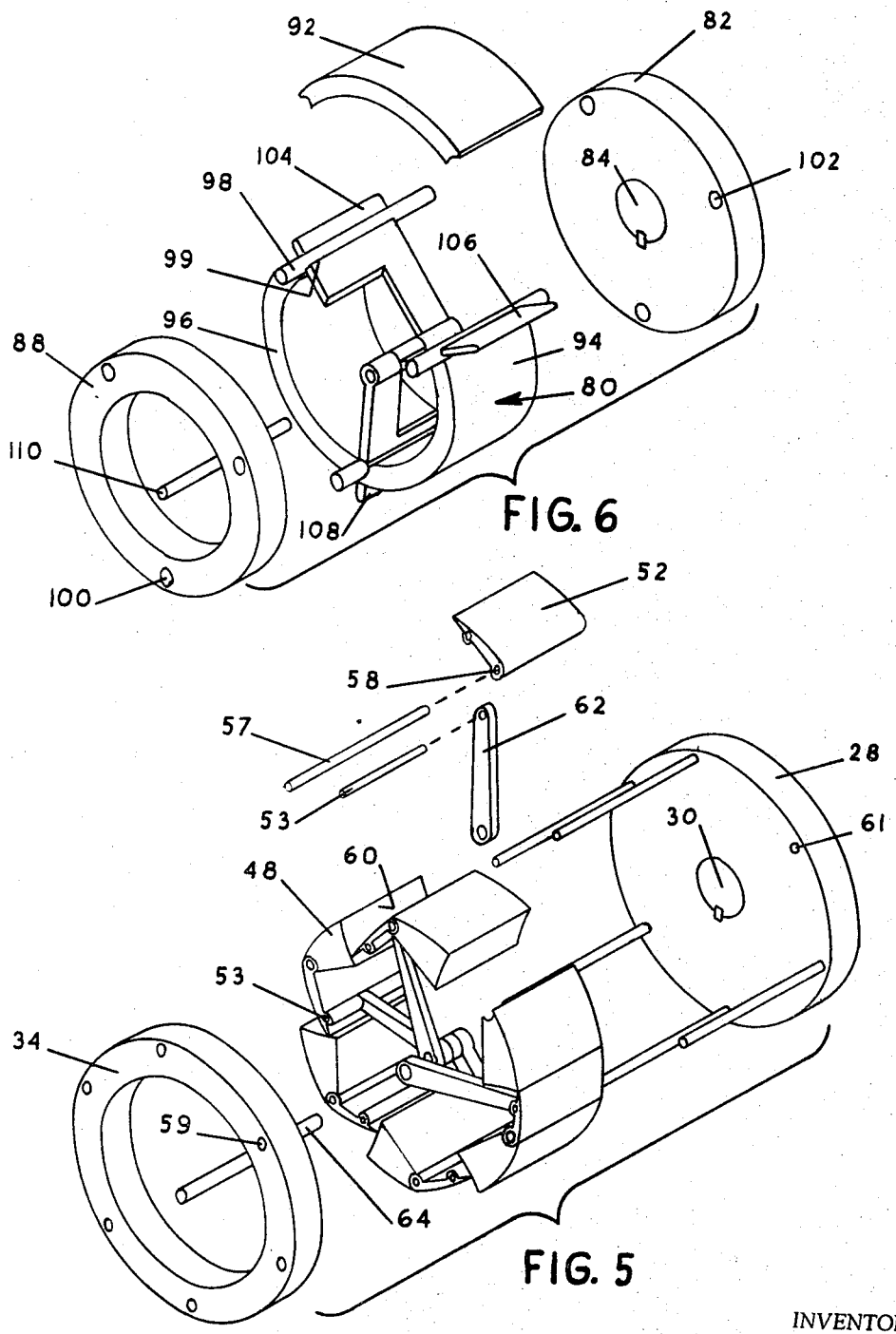
INVENTOR.
Kenneth P. Gray
BY Dec. 17, 1968   K. P. GRAY   3,416,313
FLUID TRANSMISSION
Filed March 13, 1967   3 Sheets-Sheet 3

INVENTOR.
Kenneth P. Gray
BY

United States Patent Office 3,416,313
Patented Dec. 17, 1968

3,416,313
FLUID TRANSMISSION
Kenneth P. Gray, 336 Highbridge St.,
Fayetteville, N.Y. 13066
Filed Mar. 13, 1967, Ser. No. 622,511
5 Claims. (Cl. 60—53)

ABSTRACT OF THE DISCLOSURE

Hydraulic transmission comprising a casing having at one end a variable volume rotary pump, and a constant volume hydraulic motor at the other end, the pump and motor dividing the casing into two portions, one acting as a reservoir and the other acting as a pressure chamber. The pump volume output is varied by varying the stroke of the pistons. The motor comprises vanes pivoted on a shaft eccentric of the motor output shaft and extend through pivoted slots in the motor rotor. Two such transmissions may have a common drive shaft and drive the rear wheels of the vehicle independently. A control responsive to the pressure in the pressure chamber is adapted to exert control over the pump volume output.

---

This invention relates to hydraulic transmissions, and more particularly to a transmission employing a variable displacement pump and a vane type motor.

In transmissions of the type referred to there are generally a number of ports for the flow of hydraulic fluid that are constrictive and create turbulence with a result that a substantial amount of power is wasted in the generation of heat.

The present invention is directed to a hydraulic transmission wherein passageways, ports and the like for transmission of fluid into and out of the pump and to the motor are substantially eliminated. More particularly the invention is directed to a rotary pump casing having a rotor with peripheral openings exposed to a reservoir chamber and a pressure chamber, so that piston action draws fluid into the rotary casing from the peripheral openings free from constriction. The invention further has to do with a control affording an infinite ratio between pump and motor which can be effected to provide smooth aceleration and deceleration.

In addition the apparatus is capable of varying the ratio in response to load so that automatic control is possible. The simplicity of the apparatus and the automatic control in response to load is such as to permit economical duplication so that separate transmissions may be employed to drive the wheels of a vehicle, without requiring the usual differential.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 5 is an exploded perspective view of the pump parts;

FIGURE 6 is an exploded perspective view of the motor parts;

Figure 1:
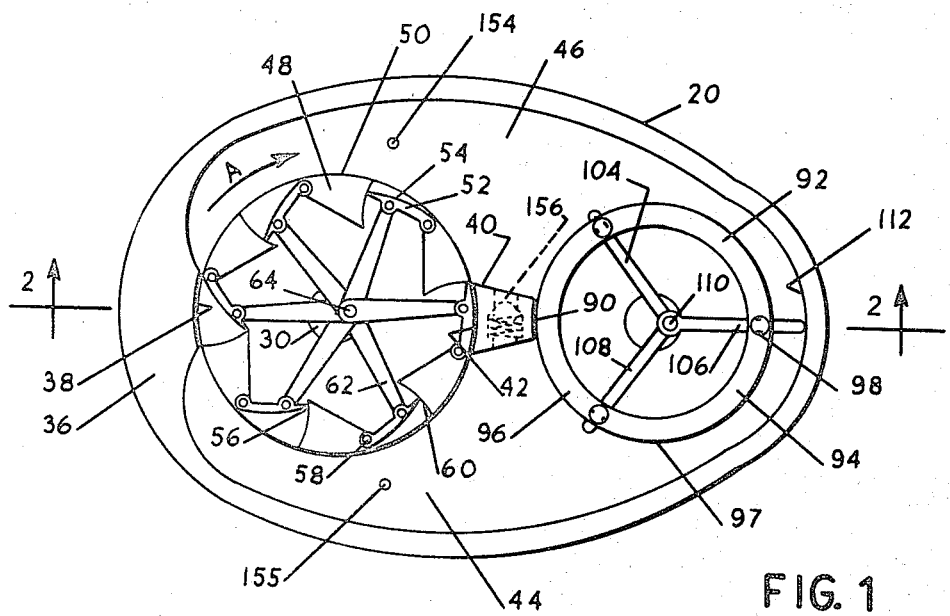
FIGURE 1 is a sectional view of the apparatus taken on a line such as 1—1 of FIGURE 2, a cover plate end rings of the pump and motor being removed.

Referring to FIGURES 1–5 there is shown a heavy casing 20 having cover plates 22 and 24 secured thereto as by studs or other fastening means not shown. The cover plate 22 is provided with a circular recess 26 to receive a circular pump rotor end plate 28 which is keyed or otherwise secured to a shaft 30, adapted to be driven by a prime mover such as an internal combustion engine or the like. The other cover plate 24 is also provided with a circular recess 32 to receive the annular rotor end plate 34, such end plate being shown in FIGURE 3. The casing 20 is provided with a land portion 36 having a cylindrical face 38 concentric with the recesses 26 and 32. A central divider block or partition 40, having a cylindrical face 42, likewise concentric with the recesses 26 and 32 is provided. The land portion 36 and divider block 40, in effect divide the casing 20 into two chambers 44 and 46, which may act as a reservoir, and pressure fluid chamber respectively, under operation of the transmission, when for example the pump is acting as a pump and rotates in the direction of arrow A.

The pump end plates 28 and 34 are connected together by six peripheral segmental blocks, such as 48. The blocks have peripheral cylindrical surfaces 50 of a radius conforming to the radius of the land and divider block surfaces 38 and 42. Each block is provided along one edge with a hinged vane or piston 52 having an external cylindrical surface 54 of a radius corresponding to the surface 50. The free edge 56 of each vane swings about its pivot 58 such pivot being provided for by a rod 57 which fits into the end plates as 59 and 61 in substantial contact with the cylindrical surface 60 of the adjacent block 48, and each vane is of an axial length such as to span the distance between the end plates 28 and 34.

Each of the pistons 52 are provided with a connecting rod 62 attached to the piston by a pin 53 and pivoted on a relatively fixed control shaft 64, which may be moved from a position coaxial with the shaft 30, or to various positions eccentric of the shaft 30. As shown in FIGURE 1, the control shaft is disposed to the right of center by approximately the maximum amount.

From the foregoing description it will be seen that rotation of the pump rotor assembly in the direction of arrow A, will result in each of the peripheral piston cavities enlarging by radial inward movement of the vanes in moving from the divider block 40 to the land 38, so that each piston cavity is filled with hydraulic fluid as it passes land 38. Beyond the land 38, the hydraulic liquid drawn or entrapped in each piston cavity is gradually discharged into the chamber 46 by the vanes, as the piston cavities travel from the land 38 to the divider block 40. Thus hydraulic fluid is supplied to the chamber 46.

Figure 4:
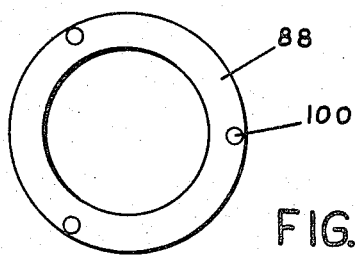
FIGURE 4 is a plan view of a motor end ring.

The fluid thus supplied to the chamber 46 can only escape to the lower chamber 44 by driving the rotor of the hydraulic motor 80, the details of which appear in FIGURES 1, 4 and 6. The motor rotor comprises a circular end plate 82 to which a drive shaft 84 journalled in the cover plate 22 is affixed, the plate being disposed in a circular recess 86 in the cover plate 22. The motor rotor at its other end comprises an annular end plate 88 disposed in a circular recess 90 in cover plate 24. A hollow cylindrical housing divided into three like arcuate sections or segments 92, 94 and 96, which are secured to the end mild mechanical treatment may, for instance, consist of striking, rubbing, brushing, or vibrating. Such treatment during the electrical treatment will not only fold out but also spread the material out.

At this point in the flow sheet of FIGURE 1 the sheet material is in a spread-out condition wherein the individual fibrils, making up the material, are parallel to the longitudinally axis of the sheet material. In many cases, and for many applications, this is a desirable configuration. However, for certain textile products the yarn used in the manufacture therein should not be lean and smooth but rather should have a high percentage of loose fibrils along the surface of the web or sheet as the case may be. For instance, in the case of blankets, carpets, and fabrics made from woolen yarns, it is essential to use a bulky yarn which is not produced under the process described in the above-identified patent.

My invention resides in forming a pile fabric from this polymeric sheet material as it emerges from the folding-out step.

Figure 3:
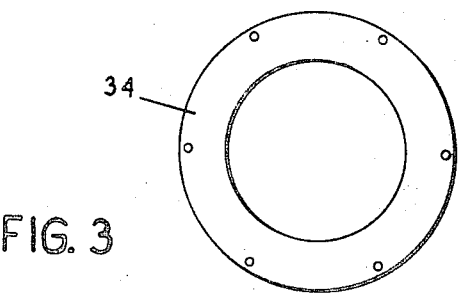
FIGURE 3 is a plan view of a pump end ring.
Figure 2:
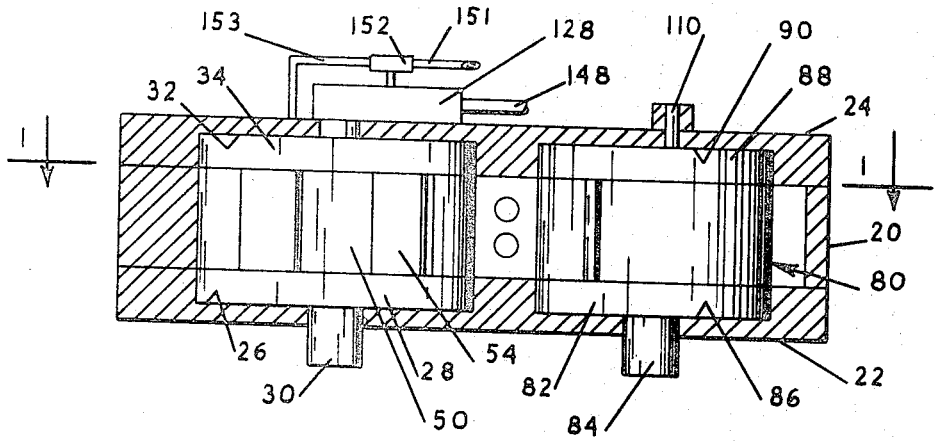
FIGURE 2 is a sectional view of the apparatus taken on the line 2—2 of FIGURE 1.
Figure 7:
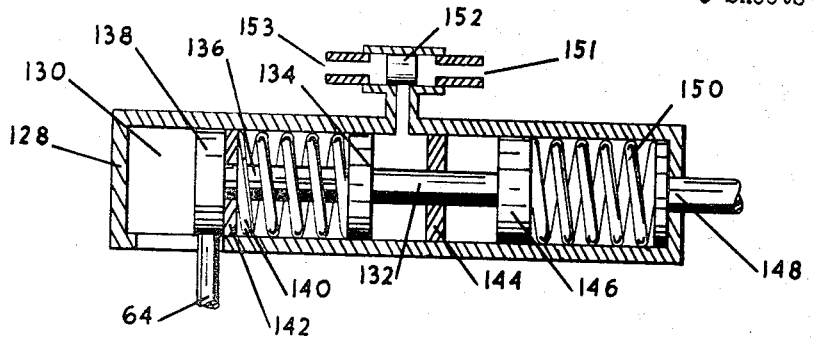
FIGURE 7 is a sectional view through the control apparatus.
Figure 8:
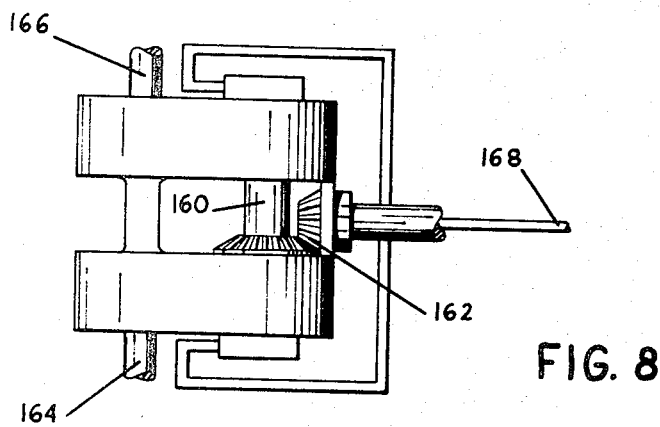
FIGURE 8 is a schematic view of two transmissions arranged to drive the opposed rear axles of an automotive vehicle, without use of a differential.
Figure 9:
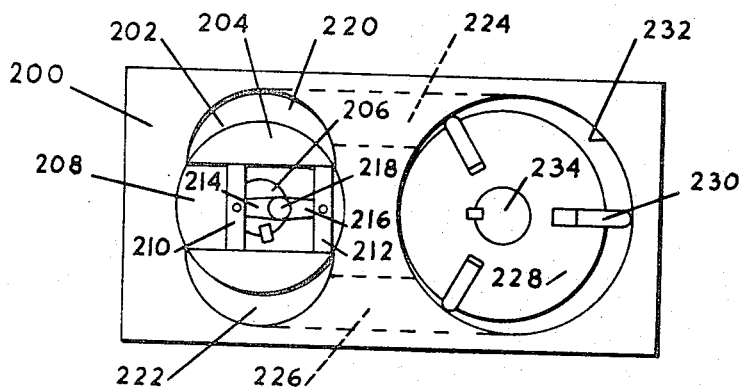
FIGURE 9 is a schematic view of a further simplified version of the invention, a side plate being removed.

With reference to FIGURES 2 and 3, after the sheet material 10 has been folded out as described hereinabove, it passes between a pair of generally cylindrical rollers 12 and 13, which are rotatably mounted in frame plates 14 and 16 respectively. These frame plates 14 and 16 extend vertically from a base plate 18 which is mounted on wheels 20. This unit is able to be wheeled into a position to receive the film 10 directly from the folding-out step described in FIGURE 1 in the event that it is desirable to make the whole process continuous. The sheet or web 10 passes from the rollers 12 and 13 to a roller 54 (see FIGURE 6) which is also rotatably mounted in plates 14 and 16.

With reference to FIGURE 6, a plurality of rollers 54 are shaped to form a crown 56 at their centers. As a result, the fibrils in the central portion of film 10 passing over the crown 56 will break while those in the edge portion of the film passing over the edge of the roller will not. This action of crowned rollers 54 (FIGURE 2) causes the fibrils in the center portion of sheet 10 to break. This web is particularly useful in making yarn and as such it is twisted by conventional yarn twisting means as it is wound onto a spool 58.

As shown in FIGURES 2 and 3, rollers 13, 54 (only one roller is shown; however, it would be within the skill of the art to connect a plurality of crowned rollers into the mechanism) and 29 are connected to a suitable driving mechanism 30. This mechanism comprises an endless belt or chain 32 which passes over a pulley or sprocket 34 which is fixed to roller 54, then over a sprocket 36 which is fixed to roller 13, then over a sprocket 38 which is fixed to roller 29, then over an idler sprocket 40, then over a drive sprocket 42, which is driven by any suitable power source such as electric motor 44, and finally back over sprocket 34. The rollers 12, 13, 54, 28, and 29 are rotated in the directions shown by the arrows.

With reference to FIGURE 4, roller 22 is provided with a plurality of grooves 24 and a plurality of needles 26 or other similar sharp, pointed implements, which project radially from the center of the grooves 24. These needles may be secured in the grooves 24 in any suitable manner. As the sheet 10 passes over the roller 22, portions of it are channelled into the grooves 24 and become impaled upon the needles which penetrate through the sheet material and cause a portion of the individual fibrils to be severed. The degree of breakage would be determined by the number of grooves in the roller and the number of pins in the grooves; however, no more than one-half of the fibers passing over the roller should be broken in order to retain sufficient web strength. In the preferred embodiment we show only one roller but it would be within the skill of the art to adapt a plurality of rollers over which the film could be passed. The film after passing over the pin-studded roller 22 is received by a pair of pick-up rollers 28 and 29 which are also rotatably mounted in the frame plates 14 and 16. These rollers feed the bulky sheet material to a suitable take-up mandrel (not shown).

FIGURE 5 illustrates another embodiment of my invention. In this embodiment a roller 46 contains a plurality of grooves 48 around the perimeter thereof. These grooves are cut at an angle of 45° to the horizontal axis 50 of the roller 46. This roller 46 is attached to frames 14 and 16 in place of roller 22. A plurality of knife blades 52 are positioned around the circumference of roller 53 rotatably mounted between the vertical frames 14 and 16 a predetermined distance from roller 46. The sheet 10 is passed between the roller and the blade. The blade 52 is rotated in close enough proximity to the roller 46 so that portions of the film 10 pass over the crown of the grooves 48 and are cut by the rotating blades 52. Because of the angle of inclination of these grooves a discontinuous chopping of the individual fibrils results without cutting entirely across the sheet itself. The strength of the sheet itself is not significantly affected. This fabric possesses a tremendous advantage over a normal pile fabric because the pile fibers form an integral part of the sheet and are firmly anchored to the surface of the sheet.

In order to illustrate with greater particularity and clarity the operation of my process, the following examples are offered as illustrative of the operation thereof. The specific materials and conditions given in the examples are presented as being typical and should not be construed to limit my invention unduly.

EXAMPLE I

A 60-inch wide fibrillated web of 0.8 mil polyethylene, having a density of 0.95 gram/cc. and a melt index of 0.3 (ASTM D 1238–5DT, Condition E), is threaded through the machine described in FIGURE 2. A chopper roller 53 is provided with 12 tempered spring steel blades 52 around its circumference. The blades 52 coact with a 12-inch diameter grooved roller 46, made of mild steel and coated to a thickness of 60 mils with 80 durometer rubber. Each groove 48 in roller 46 defines an ellipse in a plane making a 45° angle with the roller axis. These grooves are 1/8-inch wide, 1/8-inch deep, and spaced so that their centers are 1/4-inch apart, and having all their edges and corners chamfered and rounded on a 1/16-inch radius. Bulk film is fed to roller 12 at the rate of 20 feet per minute while the machine is being adjusted to insure clean, uniform cuts. After adjustment, the rate is increased to 150 feet per minute and about 2000 feet of the material is fed through the machine.

Air filters 2½ feet square are produced from some of this material by laminating 21 layers of this bulked film together, each layer being laid at right angles to the adjacent layers 21 and being stitched together in both directions across the film at 6-inch intervals with cotton string and subsequently edged with an aluminum channel having a 1/8-inch flange.

In another application ten 8-foot sections of this bulked fibrilated web are stitched together on 4-inch centers both lengthwise and crosswise and the edges bound to make an exceptionally warm, lightweight blanket.

Example II

The rollers 46 and 53 are replaced with a 12-inch diameter pin-studded roller 22 similar to that shown in FIGURE 4. The grooves 24 are ½-inch center-to-center with a sharp 60° included angle peak between the grooves. In each groove 36 equally spaced cylindrical pins 26 are positioned wherein each pin is 3/32-inch in diameter and has a flat, sharp edged top portion located 3/32-inch below the peaks. Web material similar to that used in Example I is threaded through the machine and the machine is started and run at an initial rate of about 15 feet per minute output while adjustments of the film tension over the pin-studded roller 22 are made. After adjustment, the rate is increased to 150 feet per minute to produce approximately sure portion comprising members extending from side wall to side wall and having concave cylindrical faces concentric with the rotor axis, and closely confronting said rotor, one of said members being at said one end of the casing and the other being disposed on the opposite side of said rotor, radially moving piston means in each of said recesses, and connecting rod means extending inwardly from each of said piston means, a pivot for said connecting rods, and means mounted on the other side wall for moving said pivot from a position coaxial with said shaft to an eccentric position in a direction lengthwise of the casing, and a constant volume hydraulic motor disposed in the other end of the casing, and serving in conjunction with said pump rotor and dividing members to complete the dividing means for said casing.

2. A transmission as set forth in claim 1 wherein the recesses are disposed between uniformly spaced segmental blocks connecting the end portions, and in which each piston means is pivoted adjacent one block and extends to an arcuate surface on the adjacent block that is cylindrical and concentric with the piston means pivot.

3. A transmission as set forth in claim 1 wherein spring means is provided to urge said connecting rod pivot to a position eccentric of the drive shaft axis, and fluid pressure responsive means responsive to the pressure in the pressure portion of said casing is provided for urging said pivot toward a position concentric with the drive shaft axis.

4. A transmission as set forth in claim 3 wherein means are provided for manually urging said connecting rod pivot against said spring means.

5. A transmission as set forth in claim 1 wherein the motor drives one of the drive wheels of a vehicle, and wherein the motor of a second like transmission drives the other drive wheel of the vehicle, and the pump rotor drive shaft is common to both transmissions and driven by a single prime mover.

References Cited
UNITED STATES PATENTS

| | | | |
|---|---|---|---|
| 1,036,119 | 8/1912 | Hughes | 60—53 |
| 1,851,456 | 3/1932 | Slessor et al. | 60—53 |
| 3,252,284 | 5/1966 | Von Thuengen | 60—53 |

EDGAR W. GEOGHEGAN, *Primary Examiner.*

U.S. Cl. X.R.

91—58; 103—37